Aug. 16, 1966  J. H. BOOTH  3,266,478
BARBECUE APPARATUS
Filed Jan. 10, 1964  4 Sheets-Sheet 1

INVENTOR.
James H. Booth
BY
ATTORNEYS

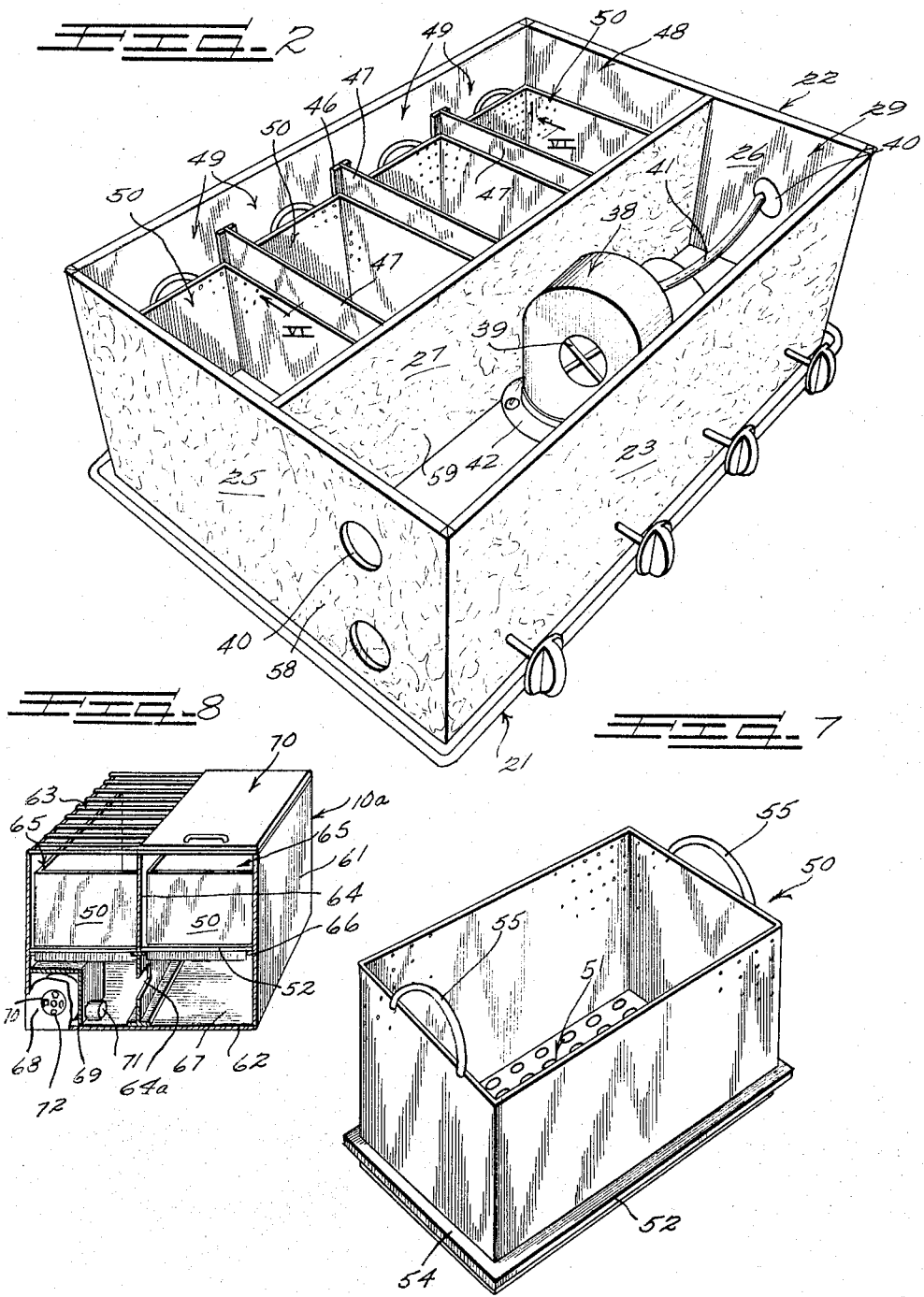

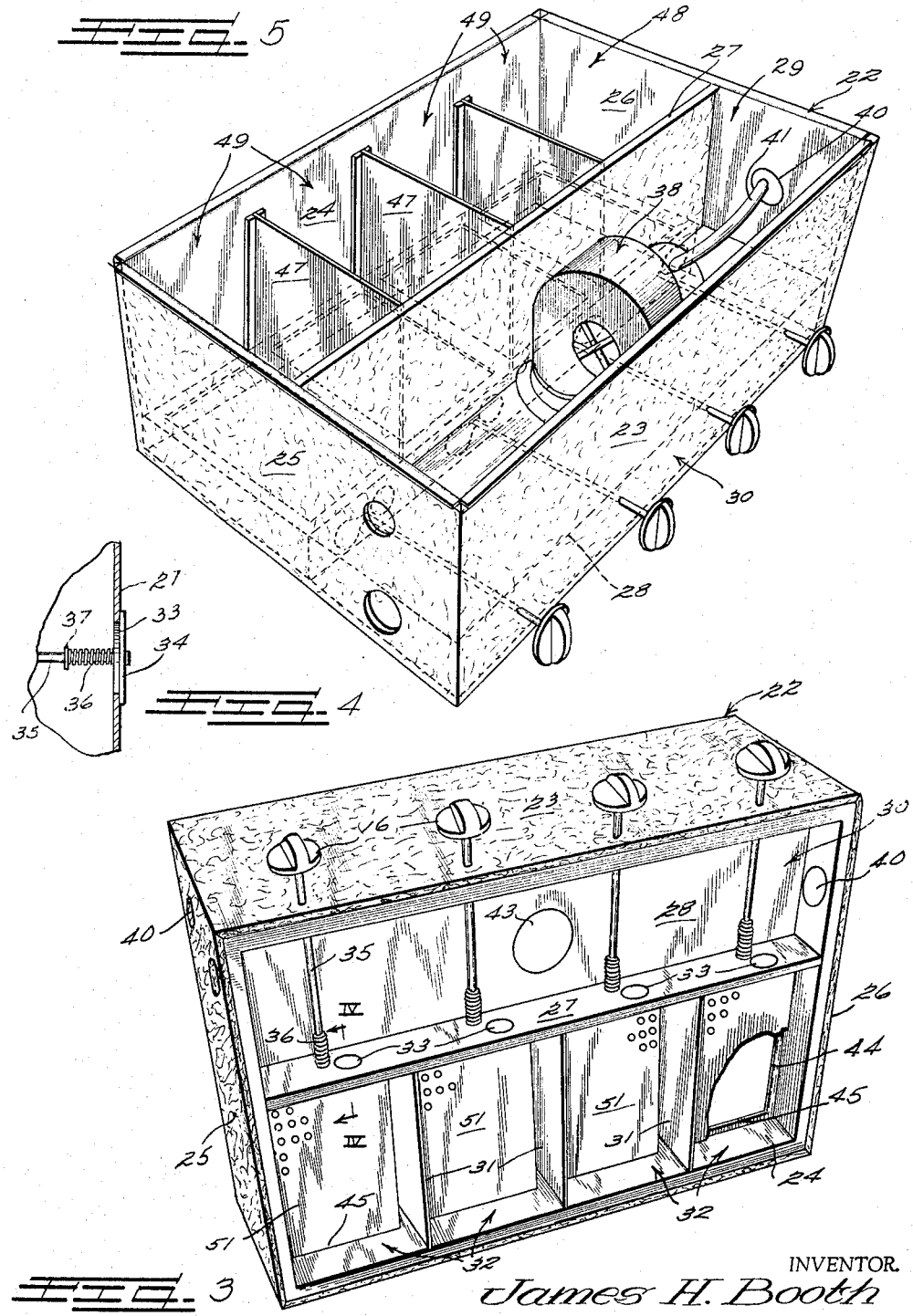

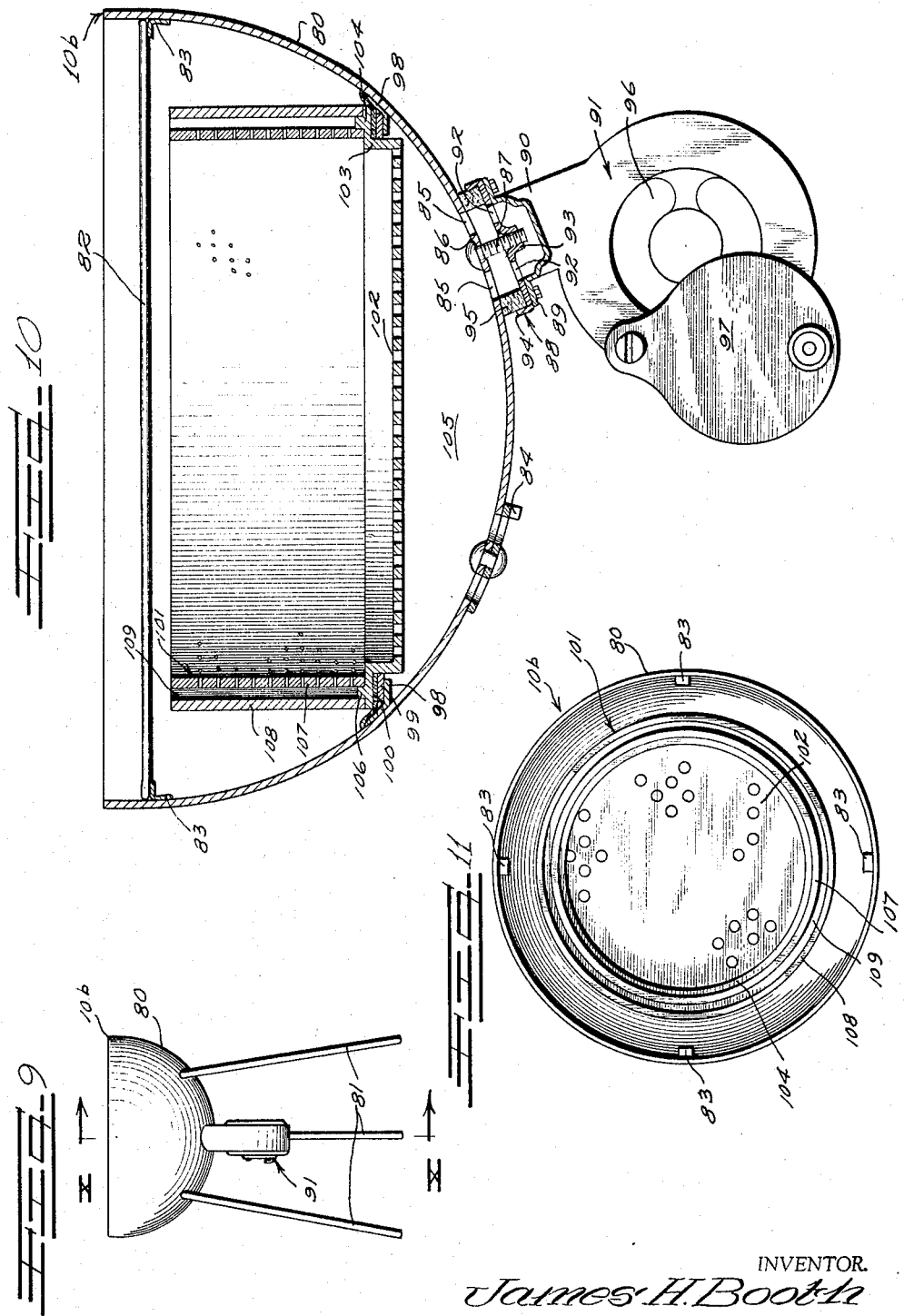

United States Patent Office

3,266,478
Patented August 16, 1966

1

3,266,478
BARBECUE APPARATUS
James H. Booth, 2906 E. Jefferson St., Detroit, Mich.
Filed Jan. 10, 1964, Ser. No. 336,925
7 Claims. (Cl. 126—25)

This invention relates to barbecue apparatus which quickly develops a uniform bed of hot coals and controls the temperature thereof. Specifically the invention deals with a charcoal range suitable for outdoor or indoor use and having one or more independent burning zones capable of delivering selected uniform temperatures across the entire area of each zone.

While the invention will hereinafter be described as embodied in a barbecue grill it will be understood that the principles of this invention are generally useful in any stove or range fired with solid fuel such as charcoal or coal and therefore the scope of the invention is not limited to the preferred illustrated embodiments.

According to this invention there is provided a cabinet or casing for a heat delivering top area which may be equipped with a grid, a rotating spit, an oven or the like. This area will be referred to for convenience, as a grill. The grill area is selectively heated by one or more fire boxes or baskets of fuel each contained in a separate compartment under the grill. The baskets are spaced from the compartment walls, rest upon supports in the bottoms of the compartments, and are readily removable either alone or with the compartment wall. Each basket has a perforate bottom grate depending into a lower chamber of the compartment which is sealed off from the upper chamber. The walls of the basket in the upper chamber of the compartment are perforated but the perforations are much smaller than the grate openings of the bottom of the basket. The cabinet carries an air blower and provides a plenum chamber feeding air upwardly through the grate of each basket or fire box.

In one embodiment of the invention the plenum chamber communicates with each lower chamber of a compartment only through a valve or damper controlled opening which is regulated from the front of the cabinet. In other embodiments, air feed is controlled by a damper on the blower.

The blower maintains the plenum chamber at a superatmospheric pressure released directly or through valves or dampers to each lower chamber of a compartment. Each such chamber is thus maintained at a desired superatmospheric pressure to force air through the grate of the overlying basket. The basket is filled to a substantial depth with solid fuel such as charcoal, anthracite coal or a mixture of both and the forced air draft through the grate soon creates a bed of burning coals which burns upwardly in the brasket.

Burning gases flow through the perforations in the walls of the basket or fire box and are trapped in the compartment where they can only flow upwardly to the grill area covering the open top of each compartment. These hot gases quickly heat the sides of the basket, the walls of which are in effect entrapped in a sandwich of hot gases between the burning bed in the basket and the compartment wall surrounding the basket. The development of extremely hot walls of the basket keeps the peripheral fuel at a very high temperature and an even burning bed of coals is developed across the entire basket instead of being confined to the center of the basket as would normally occur with radiation of heat through solid colder metallic side walls of a firebox.

2

A main feature of the invention is the perforate firebox walls which pass hot gases therethrough that are preferably baffled by a surrounding wall to sandwich the firebox wall between the burning coals and the hot gases for heating the firebox walls.

Another feature of the invention is an open bottomed cabinet resting on a supporting tray forming a bottom for the unit and receiving the ashes from the grates of each of the baskets or fireboxes.

Another feature of the invention is the provision of a plenum chamber to deliver pressured air to one or more fireboxes of a barbecue apparatus.

A still further feature of this invention is to provide a multicompartment charcoal grill with individual forced draft controls for selectively regulating the output heat of each compartment.

It is then an important object of this invention to provide barbecue apparatus with a firebox having hot gas delivery perforate sidewalls and a grate bottom receiving pressured air.

Another object of the invention is to provide a plenum chamber forced draft control for a charcoal burner.

A still further object of the invention is to provide a barbecue apparatus grill with a single elongated grill area selectively heated along its length by individually controlled fireboxes.

A still further object of this invention is to provide a charcoal stove with a firebox having perforate side walls sandwiched between hot gases to maintain a uniform bed of coal across the entire area of the box.

A still further object of this invention is to provide a barbecue apparatus with a charcoal basket surrounded by a baffle wall and receiving pressured air under control of a valve.

A specific object of this invention is to provide a charcoal burner with a removable perforated firebox surrounded by imperforate walls in spaced relation from the firebox walls for trapping hot gases emerging from the perforations of the firebox for heating the walls of the firebox to thereby develop an even burning bed of coals across the entire area of the firebox.

Other further objects and features of this invention will be apparent to those skilled in this art from the following detailed description of the annexed sheets of drawings which by way of preferred examples only illustrate three embodiments of the invention.

On the drawings:

FIGURE 2 is a view similar to FIG. 1 but with the outer cover of the apparatus removed and with a portion broken away to show an underlying part.

FIGURE 3 is a bottom perspective view of the unit of FIG. 2.

FIGURE 4 is a fragmentary section view along the line IV—IV of FIG. 3.

FIGURE 5 is a phantom view of the unit of FIG. 2 showing the inner compartments and chambers.

FIGURE 7 is a perspective view of one of the charcoal baskets or fireboxes used in the apparatus.

FIGURE 8 is a small sectional perspective view of another form of barbecue apparatus according to this invention.

FIGURE 9 is a side elevational view of another form of apparatus according to this invention.

FIGURE 10 is an enlarged vertical cross sectional view along the line X—X of FIG. 9.

FIGURE 11 is a top plan view of FIG. 9 with the grill removed.

As shown on the drawings:

Figure 1:
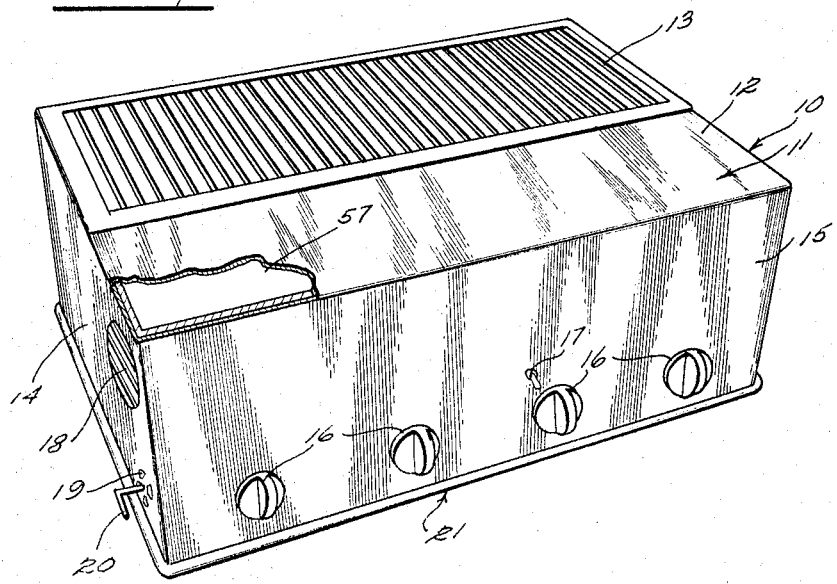
FIGURE 1 is a perspective view of one form of barbecue apparatus according to this invention with a portion broken away to show an underlying part.

In FIG. 1 the reference numeral 10 designates generally one form of barbecue grill according to this invention. The device 10 has an attractive cabinet or casing 11 with a flat top wall 12 that is apertured along the back end thereof and receives a grill covering 13 over the aperture. The casing has upright end walls such as 14 and a front wall 15. The casing may be closed with a back wall (not shown) or may have an open back. The front wall has four handles or knobs 16 projecting from the front face thereof and aligned in a single row near the bottom of the front face 15. An electric toggle switch 17 is also mounted on the front face 15. The end wall 14 has a large diameter opening 18 in the upper front quadrant thereof and damper opening 19 in the lower front quadrant thereof with a dampener handle 20 projecting from the end wall.

The casing 11 is open bottomed and rests in a tray 21. The casing 11 is composed of sheet metal such as stainless steel or the like decorative material and covers a cast or sheet metal box-like unit 22 as shown in FIGS. 2, 3 and 5. The unit 22 has an upstanding front wall 23, a corresponding rear wall 24, end walls 25 and 26 and a longitudinal upstanding partition wall 27 about midway between the front and rear walls but preferably located in the front half of the box. A bottom wall 28 extends from the front wall 23 to the partition wall 27 and from the end wall 25 to the end wall 26 at a level above the bottoms of these walls to cooperate therewith for forming a deep open topped chamber 29 and a shallow open bottomed chamber 30 in the front end of the unit 22.

As best shown in FIG. 3 three partition walls 31 in equally spaced relation extend vertically between the rear wall 24 and the partition wall 27 to cooperate therewith in defining four open bottom chambers 32 behind the chamber 30. The portion of the partition wall 27 below the bottom wall 28 has four apertures 33 each registering with a chamber 32. These apertures 33 are controlled by damper plates 34 mounted on rods 35 journaled in the walls 27 and 23 and having the handles 16 on the outer ends thereof. As shown in FIG. 4 a coiled spring 36 encompasses each rod 35 and is compressed between the wall 27 and a shoulder 37 on the rod for biasing the dampers 34 against the back face of the wall 27 to tightly hug the periphery of the aperture 33. The damper plate 34 is fixedly connected to the end of the rod 35 so that rotation of the rod will swing the damper to cover and uncover the aperture 33 while the spring load on the damper maintains a substantially leakproof sliding face engagement between the back face of the wall 27 and the damper plate.

As best shown in FIGS. 2 and 5 an electric motor driven blower unit 38 is mounted in the top compartment 29 and receives air from this compartment through an inlet 39. Openings 40 are provided in the end walls 25 and 26 to register with the openings such as 18 of the casing 11 for free access of outside air into the compartment 29. The electric conduit 41 for energizing the motor of the unit 38 can be inserted through one of these openings 40 as shown.

The casing of the blower unit 38 has an out-turned flange 42 around the discharge outlet thereof which is secured to the bottom wall 28 of the chamber 29 around an opening 43 through the center of the bottom wall 28 as shown in FIG. 3. Air from the blower unit 38 is thus delivered under pressure to the lower chamber 30 which, when closed by the bottom tray 21, provides a plenum under superatmospheric pressure which can be bled as desired through the apertures 33 into the chambers 32 under the control of the valves or dampers 34. The end walls 25 and 26 are also provided with the damper openings 19 registering with the openings in the casing end walls 14 to vent the plenum to the atmosphere as desired for a purpose to be more fully hereinafter described.

Figure 6:
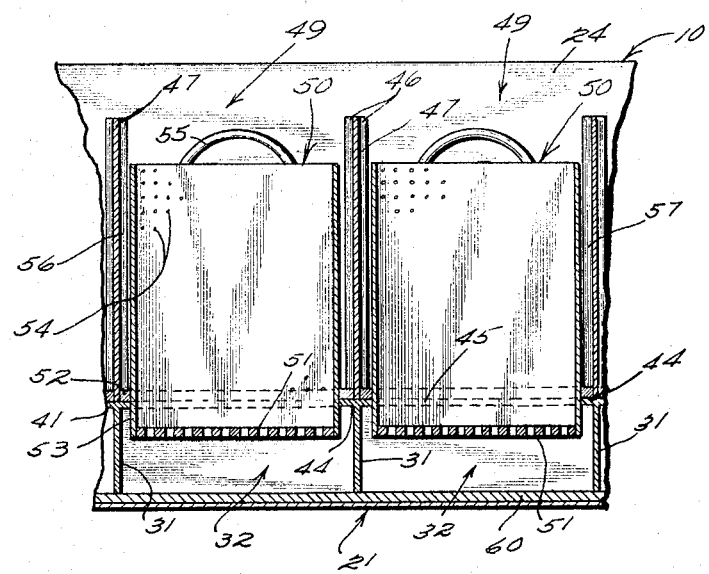
FIGURE 6 is a fragmentary vertical cross sectional view along the line VI—VI of FIG. 2.

As best shown in FIG. 6, the top ends of the partition walls 31 have horizontal heads or legs 44 providing supports extending from the front to the rear on each side of each chamber 32. Ledges or ribs 45 level with the heads 44 are secured to the inner faces of the rear wall 24 and partition wall 27 in each chamber 32. A peripheral support is thereby provided at the top of each chamber 32.

Above this peripheral support, as shown in FIG. 6, the partition wall 27 and the rear wall 24 have secured thereon, pairs of vertical channel strips 46 in spaced parallel relation defining a groove therebetween which receives partition plates 47 resting on the heads or ledges 44 of the walls 31. These partition plates 47, as best shown in FIGS. 2 and 5, divide the upper open topped rear chamber 48 of the unit 22 into four side-by-side compartments 49 each of which receives a metal firebox or basket 50.

As best shown in FIG. 7 each basket 50 is rectangular with an open top and a perforate grate bottom 51. A peripheral projecting flange or ledge 52 is provided around the box 50 in spaced relation above the grate bottom 51. The side and end walls of the box below this ledge 52 are imperforate as shown at 53 in FIG. 6. The sides and end wall of the box above this ledge are perforated as shown at 54. The perforated walls 54 have somewhat smaller perforations than the grate 51. Handles 55 are provided on the end walls of the box and extend above the open top of the box for easy access.

The box 50 is dimensioned to fit freely in the compartment 49 in spaced relation from the walls defining this compartment and the ledges or flanges 52 of the box are dimensioned to fit snugly on the heads 44 of the partition walls 31 and on the flanges or ledges 45 provided on the rear wall 24 and partition wall 27.

When the boxes 50 are lowered into the compartment 49 as illustrated in FIG. 6 they are supported from their flanges 52 and are automatically centered in the compartment 49 to provide open top flues 56 around the box. The portions of the box below the flanges 52 depend into the bottom chambers 32 with the grate bottoms 51 at levels below the supporting ledges for the box.

As illustrated in FIG. 2 the open tops of the baskets or fireboxes 50 are slightly below the open top of the chamber 48 and this chamber 48 underlies the grill 13 of the covering casing or hood. The top wall portion 12 of the casing or hood is lined with heat insulating material such as a sheet of asbestos 57 as shown in FIG. 1 and the side and end walls of the unit 22 are covered with a layer of insulating material such as a sheet of asbestos as shown at 58 in FIG. 2. The compartment 29 is preferably insulated from the compartment 48 by covering the partition wall 27 with a sheet of insulation material such as asbestos shown at 59 in FIG. 2. Likewise the bottom tray 21 is preferably covered with a sheet of insulation material such as asbestos 60 shown in FIG. 6.

In operation the box unit 22 is placed on the insulation covered supporting tray or bottom 21, the desired number of baskets or fireboxes 50 to be used have their grate bottoms covered with a thin layer of solid fuel such as charcoal, anthracite coal, or a mixture of both. The baskets are lowered into the compartments 49 to rest on the supporting ledges in the bottoms of these compartments. The layer of coals in each box is ignited with the aid of suitable starting material. The motor switch 17 is actuated to energize the blower 38 and the handles 16 are rotated to open only those apertures 33 supplying compartments 32 which contain a burning fuel filled basket. The dampers 20 to the plenum chambers 30 are closed and the blower develops a superatmospheric pressure in the plenum chamber 28 which is bled off through the open apertures 33 to supply an even draft of pressured air to the chambers 32 and upwardly through the grates 51 into the interiors of the fuel boxes 50. The layer of fuel in each box is soon brought up to a high heat and the boxes are then filled to a desired height with fuel which is dumped on top of the briskly burning bottom layer. Air cannot leak from the chambers 32 into the flues 56 because the flanges and supporting ledges cooperate with the solid basket side walls 53 to confine the air flow only through the gate 51 into the basket.

The air forced through the basket flows upwardly through the bed of coals some of it passing through the perforations in the side walls and into the flues 56 from which it can only flow upwardly out of the open tops of the compartments. The perforate side walls of the fireboxes promote peripheral heating of the flue because burning gases will pass through the perforations. In effect the perforate side walls of the basket are sandwiched between hot gases rising vertically on the inside of the basket and also through the flues around the basket. The side walls of the basket are soon heated to a cherry red condition and keep the peripheral fuel in the basket at a very high temperature. As a result the entire bed of coals in the firebox burns evenly across its entire area eliminating cold spots that normally develop through contact of the peripheral fuel with cold side walls.

When good burning beds of coal are established in the baskets, the handles 16 can be turned to close down the apertures 33 and bleed only the desired amount of air from the plenum chamber into the compartments 32. In this manner the air draft is carefully regulated and the temperature of the burning bed of coals is closely controlled. If desired the dampers or valves 34 can completely close selected apertures shutting off air flow to the baskets and soon slowing up or even stopping burning of the fuel. If a forced air draft is not desired the blower 38 can be de-energized and air supplied to the plenum chamber from the damper openings 19 in the side walls 25 and 26. A natural draft of air will flow through the baskets to keep the plenum chamber 28 cool.

The partition plates 47 may become quite hot and provision is made for expansion by having the plates fit rather loosely in the supporting strips 46.

From this description it will be understood that the grill 13 is supplied with heat from a number of separate compartments each of which can be individually controlled to deliver the desired heat. The sections of the grill overlying the various compartments can be simultaneously used for different types of broiling or cooking.

A simplified version of the invention is illustrated at 10a in FIG. 8 wherein an open top and open bottom box 61 rests on a supporting tray 62 and has a grill 63 covering the top thereof. A partition 64 divides the box into two side-by-side upper compartments 65 and as shown the lower portion of this partition is apertured at 64a. The compartments 65 have supporting ledges 66 for the baskets or fireboxes 50 which receive the flanges 52 in tight engagement to seal off a single bottom plenum chamber 67 from the upper compartments 65. This plenum chamber 67 has a sealed off section 68 housing a blower 69 receiving air from an inlet 70 in the front wall of the casing and discharging this air through an outlet 71 into the plenum chamber. In this arrangement the plenum chamber 67 is also the ash receiving chamber but the sealed off compartment 68 for the blower 69 protects the motor and blower unit from the hot ashes. This compartment can be insulated. A lid or cover 70 is provided for the open tops of the chambers 65 and can be placed over the grill 63 to shut off a compartment that is not being used. Air intake to the plenum chamber 67 is controlled by a damper regulator 72 on the intake 70 of the blower.

The unit 10a, like the unit 10, provides compartments each of which contain a fuel box and the forced draft to the fuel boxes is controlled by an arrangement on the intake of the blower. The lid 70 can be used to divide flow between the several compartments as desired.

A further simplified version of the invention is illustrated at 10b in FIGS. 9 to 11 wherein an open top bowl 80, supported on legs 81, is equipped with a plenum chamber, a perforate firebox and a surrounding baffle wall to provide a uniform heated grill area of controlled temperature. In this embodiment of the invention only a single firebox is used but if desired the bowl area could be provided with several individual fireboxes as in the embodiments 10 and 10a.

The barbecue apparatus 10b of FIGS. 9 to 11 has the barbecue bowl 80 thereof equipped with a top grill 82 supported on brackets 83 secured to the inner face of the bowl near the open top thereof. This type of barbecue bowl normally has a plurality of adjustable vents regulated by rotatable covers, in the bottom area thereof as illustrated at 84. These vents supply a draft to a bed of burning charcoal in the bowl.

In accordance with this invention one of the vents has the cover removed therefrom and the discharge outlet of a blower is mounted on the bowl in place of the cover. As shown in FIG. 10 a ring of vent holes 85 in the bottom of the bowl surround a smaller central aperture 86 receiving a screw 87 therethrough which is threaded into an adapter plate 88 that is bolted onto the flange 89 around the discharge outlet 90 of an electric motor driven air blower 91. The adapter 88 has a ring of holes 92 surrounding a central internally threaded boss 93 which receives the screw 87. The adapter also has a peripheral upturned flange 94. A flexible heat insulating gasket or washer 95 fits within the flange 94 and is compressed between the adapter 88 and the bottom of the bowl to seal the air passage from the outlet 90 to the apertures 85 and to also heat insulate the blower unit 91 from the bowl 80. The washer or gasket 95 can be composed of asbestos or the like insulation material.

The blower 91 has a side inlet 96 controlled by a damper cover 97 which is pivotally mounted on the blower casing. The position of the damper relative to the opening controls the air flow to the bowl apertures 85.

The bowl has a ring of brackets 98 secured to the inner face thereof at a level substantially below the brackets 83 but above the bottom of the bowl. These brackets support a metal ring 99 covered by an asbestos gasket ring 100.

A basket or firebox 101 has a perforate grate bottom 102 with an imperforate peripheral wall 103 extending upwardly to an imperforate out-turned radial flange 104. The peripheral wall 103 snugly fits within the ring 99 and the flange 104 overlies the asbestos gasket 100 to cooperate with the ring and gasket for sealing off a plenum chamber 105 in the bottom of the bowl beneath the grate 102. As shown the outer periphery of the gasket 100 is larger than the metal ring 99 and is pressed by the flange 104 over the brackets 98 to seal tightly against the inner face of the bowl 80.

The flange 104 has an upturned rib 106 therearound providing an internal shoulder receiving a perforated cylindrical wall 107 and an external shoulder receiving therearound an imperforate cylindrical wall 108. The wall or collar 107 can be welded or otherwise secured to the flange 104 and rib 106 to provide an integral firebox 101 with a perforate grate bottom 102 and a perforate cylindrical side wall 107. The wall 108 however is preferably in the form of an imperforate metal collar which is loosely dropped around the rib 106 so as to be readily removable and to accommodate expansion at high temperatures. This collar 108 cooperates with the wall 107 to provide a closed bottom open top annular flue 109 to trap the hot gases emerging from the perforations in the wall 107 and force these gases to flow upwardly thereby heating the wall and creating the uniform burning bed of coals throughout the entire extent of the firebox 101. If the coals are allowed to contact the bowl 80, on the other hand, heat would be rapidly dissipated and the peripheral coals would not deliver as much heat as the central coals.

In operation of the apparatus 10b, the charcoal in the basket or firebox 101 covers the grate 102 and receives air under pressure from the plenum chamber 105 with the air causing rapid combustion of the coal and passage of hot gases upwardly through the bed of coals and also through the perforations of the basket walls into the flues 109 for delivering uniform controlled heat to the overlying grill 82. The amount of air flow is controlled by the damper cover 97 on the blower unit 91. When it is desired to operate the apparatus 10b without the forced air from the blower 91, the adjustable vents such as 84 can be opened as desired to supply atmospheric air to the plenum chamber 105.

The unit 10b, like the units 10a and 10, provides a firebox or basket receiving air from a plenum chamber under the control of dampers and flowing hot gases through the perforate side walls of the basket into an open top flue for heating the side wall to maintain an even temperature across the entire area of the burning fuel bed in the basket.

From the above description it will now be understood that the invention provides a barbecue apparatus with one or more heating zones that can be controlled as desired. Each zone delivers a uniform heat throughout its entire area. The devices of the invention have individual fireboxes or baskets which can be easily charged, emptied and cleaned and the entire unit is easily disassambled for cleaning and assembled for operation. The unit can be portable or built in and only requires a source of electric power for operation of the blower motor such as an electric outlet plug or a battery.

Although various minor modifications might be suggested by those versed in the art, it should be understood that I wish to embody within the scope of the patent granted hereon all such embodiments as reasonably and properly come within the scope of my contribution to the art.

I claim as my invention:

1. A barbecue apparatus which comprises a box having an open top and an open bottom, a tray closing the open bottom of the box, a vertical partition wall dividing the box into front and rear compartments, a horizontal wall in the box closing the bottom of the front compartment above the bottom of the box and dividing the front compartment into an open topped upper blower chamber and an open bottomed lower plenum chamber, a blower in the blower chamber discharging air to the plenum chamber, means dividing the rear chamber behind the partition wall into a plurality of open top compartments in side-by-side relation, each compartment having a supporting ledge around the bottom thereof above the bottom of the box, a firebox having a peripheral flange supported on the ledge in each compartment, said firebox having an open grate bottom, apertures in the vertical partition wall joining the plenum chamber with the compartments beneath the grates of the fireboxes, rods journaled in the box extending through the front wall thereof, rod rotating handles on the rods in front of the front wall, damper plates on the rods controlling the apertures in the partition plate for regulating air flow from the plenum chamber to the compartments, a hood covering the box having a top wall closing the blower chamber and a grill overlying the heating compartments, and dampers controlling air flow into the plenum chamber.

2. A barbecue apparatus which comprises an open topped metal bowl, a blower mounted on the bottom of said bowl discharging into the bottom portion of the bowl, a firebox supported in said bowl having a grate bottom above the bottom of the bowl receiving air from said blower therethrough, said firebox having an upstanding perforate collar confining a bed of coals therein, and an imperforate collar surrounding said perforate collar in spaced relation and coacting therewith to define an open top flue receiving hot gases from a bed of coals in the firebox to heat the perforate side wall of the firebox and maintain good burning around the periphery of the firebox.

3. A barbecue apparatus which comprises an open topped bowl, a plurality of brackets in said bowl above the bottom thereof, a metal ring supported on said brackets, an insulating ring overlying said metal ring, a perforate grate having a peripheral wall projecting through said rings and an outturned flange supported on said insulating ring and coacting therewith to seal off a plenum chamber in the bottom of the bowl beneath the grate, a perforate collar supported on said grate flange extending upwardly in the bowl and coacting with the grate to define a firebox in the central portion of the bowl, and a blower mounted on the bottom of the bowl supplying air to the plenum chamber.

4. A barbecue apparatus which comprises a body member having a bottom wall and upstanding side walls forming a compartment within said body member which is closed at the bottom and open at the top to provide a grille cooking area, an imperforate peripheral ledge projecting inwardly from said side walls above said bottom wall for partitioning said compartment into an upper heating chamber and a lower plenum chamber, a firebox within said compartment having a perforate grate bottom and perforate upstanding side walls situated in spaced relation to the corresponding upstanding side walls of said body member to provide flues around the side walls of said firebox which are open at the top of the firebox, a peripheral flange formed around said side walls of said firebox above said bottom thereof and projecting outwardly for supporting said firebox on said peripheral ledge, and a vent opening in said body member communicating outside air with said plenum chamber whereby the air entering said plenum chamber must pass through the grate bottom of the firebox and above said ledge before it can pass through the perforate side walls of said firebox into the flues around said firebox.

5. The barbecue apparatus as defined in claim 4 and including forced air means for pressurizing said plenum chamber to increase air flow through the grate bottom of said firebox and into said flues around said firebox.

6. A barbecue grille or the like which comprises a body member having imperforate walls defining a plurality of upstanding heating compartments in side-by-side relation, said body member having a plenum chamber in communication with the bottoms of each of said heating compartments for supplying air thereto, a valve between each heating compartment and the plenum chamber, handle means accessible from the front of said body member for actuating the valves, an upstanding firebox in each compartment having perforate side walls in spaced relation to the walls of its corresponding compartment to provide flues which are open at the top and which surround said firebox, each of said fireboxes having a perforate grate bottom above the bottom of its corresponding compartment, an imperforate peripheral ledge in each compartment, a corresponding peripheral flange on each of said fireboxes substantially at the grate bottom thereof for resting on said ledge to support said fireboxes above the bottoms of said compartments and to partition the bottoms of said compartments from their corresponding flues around the fireboxes, whereby air entering the bottoms of said compartments from said plenum chamber must pass through the grate bottoms of the fireboxes and above said ledges before passing into the flues around the fireboxes.

7. The barbecue apparatus as defined in claim 6 and including forced air means for receiving air from outside said body member and for pressurizing the plenum chamber.

(References on following page)

References Cited by the Examiner

UNITED STATES PATENTS

| | | | |
|---|---|---|---|
| 331,622 | 12/1885 | Fales | 126—144 |
| 1,579,384 | 4/1926 | Murray | 110—72 |
| 1,806,178 | 5/1931 | Rathgeb | 126—146 X |
| 2,221,098 | 11/1940 | Langsam | 126—25 |
| 2,536,919 | 1/1951 | Doyle | 126—144 |
| 2,624,300 | 1/1953 | Honsinger | 110—72 |
| 2,742,892 | 4/1956 | Herzer | 126—25 X |
| 2,983,269 | 5/1961 | Montesano | 126—25 |
| 2,996,597 | 8/1961 | Persinger et al. | |
| 3,060,868 | 10/1962 | MacLachlan | 126—25 |
| 3,087,416 | 4/1963 | Drews | 126—25 X |

FOREIGN PATENTS 21,320   10/1898   Great Britain.

FREDERICK KETTERER, *Primary Examiner.*